June 19, 1962 L. R. POE 3,039,837

LATCHING DEVICE

Filed Jan. 8, 1960 2 Sheets-Sheet 1

INVENTOR.
Lloyd R. Poe

BY

Pennie, Edmonds, Morton, Barrows & Taylor
ATTORNEYS

LATCHING DEVICE

Filed Jan. 8, 1960 2 Sheets-Sheet 2

INVENTOR.
Lloyd R. Poe
BY
Pennie, Edmonds, Morton, Barrows & Taylor
ATTORNEYS

United States Patent Office 3,039,837
Patented June 19, 1962

3,039,837
LATCHING DEVICE

Lloyd R. Poe, Los Angeles, Calif., assignor to Hartwell Corporation, a corporation of California
Filed Jan. 8, 1960, Ser. No. 1,329
2 Claims. (Cl. 312—320)

This invention relates to latching devices and, more particularly, to an electronic chassis latch characterized by novel means for holding the latch in closed position and for varying the extent to which the chassis is displaceable into fixed position as a result of the latching action.

Electronic chassis are structural elements, often manually transportable, in which various electronic components are mounted. They are designed to be removably supported in frames in such a manner that their electronic components make proper electrical contact with terminals in the frame. Hence, such chassis are designed to be easily carried about and to slide readily into place in the frame. It is the primary purpose of this invention to provide an improved latch for locating and securing electronic chassis elements of this type in their frames.

One of the major characteristics of the new latch is that it includes multiple locking features which serve to hold the chassis in its proper fixed position. They provide complete assurance that the chassis wil not be inadvertently displaced after it is once positioned and that the terminals of the electronic components will remain in operative contact with the various stationary terminals on the frame. At the same time, the locking means are quickly releasable for ready manual removal of the chassis from the frame. Another primary feature of the new latch which makes it particularly adaptable for use in electronic chassis is the provision of novel adjustment means which permit variations to be made in the displacement of the chassis during the closing of the latch. Consequently, the locking action of the new latch can cause the chassis to assume various fixed positions relative to the frame to adjust for different types of electrical terminals therein.

Broadly stated, the latch of the invention is to be used with a frame and an element movable into a fixed position with respect thereto. The latch comprises a locking member pivotally mounted on the element and movable between open and closed positions. The locking member includes an arcuately projecting keeper. Extending from the frame is a pin which is within the range of movement of the keeper when the element is in a position approaching its fixed position. Thus, the keeper may be hooked about the pin by moving the locking member toward its closed position. Cam means are provided on the keeper which are slidably engageable with the pin when the locking member is pivoted toward its closed position to displace the element into full fixed position. Adjusting means are also located on the locking member for varying the extent to which the element is displaceable by the cam means into full fixed position. Stop means may also be provided on the element for releasably holding the locking member in its closed position.

The invention further provides the combination of the above-described latch with a frame which has first electrical terminals thereon and a chassis element having second electrical terminals thereon. The chassis element is slidable into a fixed position with respect to the frame wherein the second terminals are in electrical contact with the first terminals. This particular combination relates to electronic chassis of the type described previously which carry various electronic components and which are adapted to be manually inserted in a frame in operative electrical contact with terminals therein.

A new latch constructed according to the invention provides a simple positive locking device which fits compactly in the chassis assembly. The adjustable design of its locking member provides ready variation in the fixed position of the chassis with respect to the frame without resorting to shims or other detachable elements. As will be clear from the following description of a preferred embodiment of the new latch, it can be made to include a manual gripping bar by which the chassis can be easily carried about and inserted in the frame. The movement of the gripping bar during insertion in the frame is a particularly natural operation since it is pushed down and in to insert the chassis and is pulled up and out to remove it. Also, in the inserted position the handle is practically flush with the face of the chassis and frame.

A preferred embodiment of the new latch is described hereinbelow with reference to the accompanying drawings, wherein.

Figure 1:
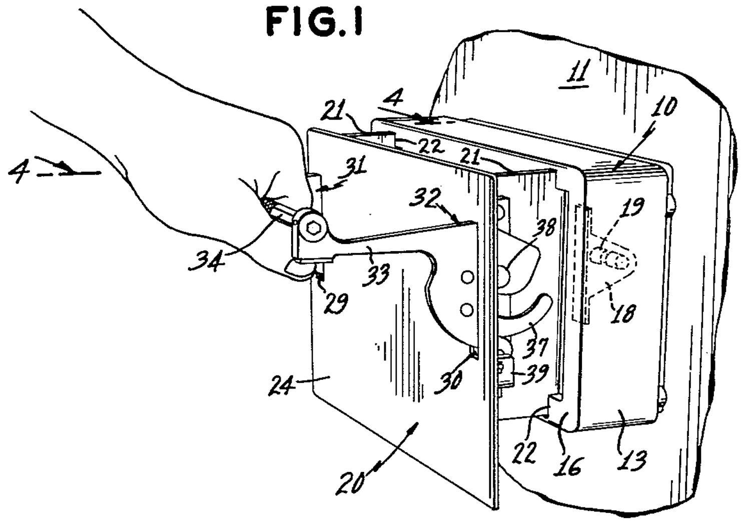
FIG. 1 is a perspective view of an electronic chassis equipped with the new latch shown in its initial position during insertion into a frame.
Figure 2:
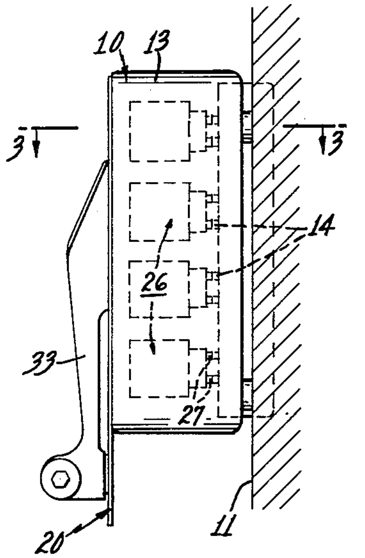
FIG. 2 is a partially schematic side elevation of the chassis in its fixed position relative to the frame.

Referring first to FIGS. 1 and 2, a frame unit 10 is shown which may be part of a larger apparatus frame 11 and may be mounted thereon by any suitable means. The frame unit 10 is made up of side panels 13 extending outwardly from the face of the apparatus frame 11. A multiplicity of suitable electrical terminals 14 are located within the frame unit 10 and are recessed within the side panels 13. A peripheral face plate 16 defining a substantially rectangular aperture forms the outer face of the frame unit 10.

Figure 3:
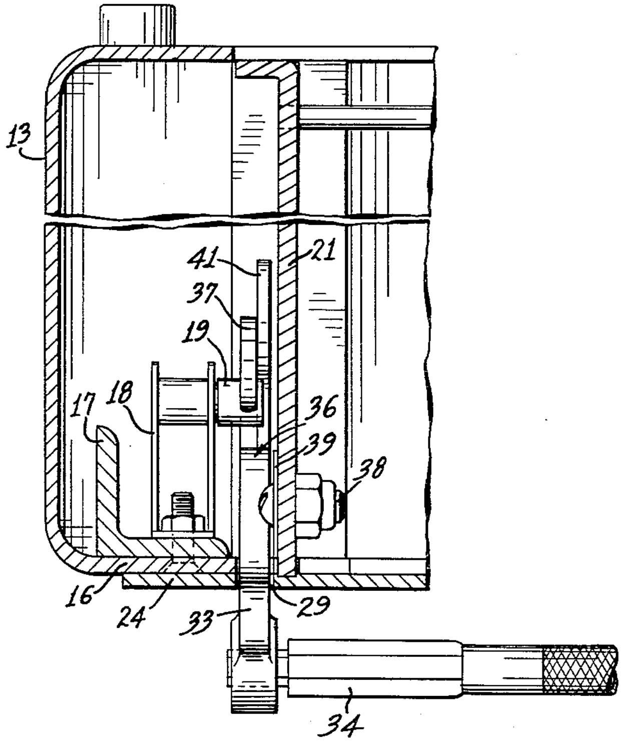
FIG. 3 is a fragmentary section partly broken away and taken along the line 3—3 of FIG. 2.
Figures 4, 5, 6:
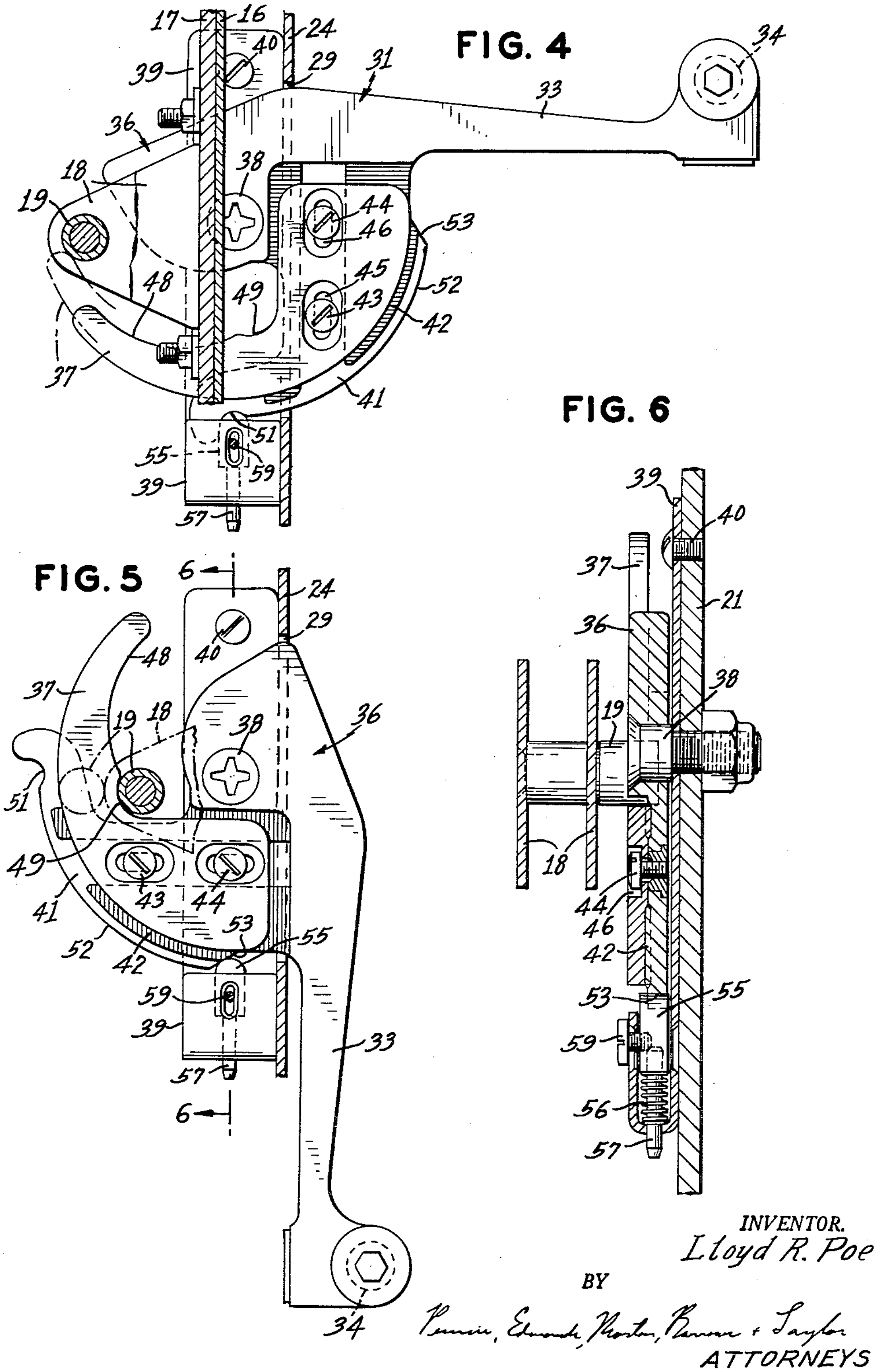
FIG. 4 is a section taken along the line 4—4 of FIG. 1 showing the latch in open position.
FIG. 5 is a section similar to that of FIG. 4 showing the latch in closed position.
FIG. 6 is a section taken along the line 6—6 of FIG. 5.

As shown most clearly in FIGS. 3 and 4, angle members 17 are bolted to the inside surface of the face plate 16 along with standards 18 adjacent the respective vertical side panels 13. There are two such sets of the standards 18, one on either side of the frame unit 10 immediately within the aperture formed by a peripheral face plate 16. The standards 18 extend inwardly and at their outer ends they have opposed coaxial rotatable pins 19 mounted thereon.

In FIGS. 1, 2 and 3, a chassis element 20 is shown which is provided with flat upright sections 21 adapted to slide within four slots 22 formed in the face plate 16 of the frame unit 10. The upright sections 21 extend perpendicularly from a cover section 24. The particular construction of the frame unit 10 insofar as it is adapted to slidably receive the chassis element 20 is not of considerable importance and is shown herein in a simplified manner for purposes of clarity. It is to be noted, however, that the chassis unit 20 is adapted to slide into the frame unit 10 into a substantially flush position as shown in FIG. 2.

Mounted within the chassis element 20 are a plurality of electronic components 26 or the like illustrated in FIG. 2. Each of the components 26 includes electrical terminals 27 which are adapted to make operable electrical contact with the terminals 14 when the chassis unit 20 is located in its inserted fixed position shown in FIG. 2. These contacts may be of the plug-in type so that the connections may be broken simply by pulling the chassis unit 20 out of the frame unit 10. It is the primary purpose of the present invention to provide means for securing the chassis unit 20 in position within the frame unit 10 such that the terminals 14 and 27 make a good electrical contact and also in such a manner that the chassis unit 20 may be readily removed from the frame.

To this end, upright slots 29 and 30 are formed in the edge portions of the cover section 24 of the chassis unit 10 to receive a portion of latches 31 and 32. The latches 31 and 32 each include handle portions 33 which are interconnected at their outer ends by an exterior knurled gripping bar 34. When the latches 31 and 32 are in their open position, the knurled gripping bar 34 is disposed approximately over the center of gravity of the chassis element 20 so that the element 20 may easily depend from the gripping bar 34 when carried about manually. For purposes of illustration, only the latch 31 will be described in detail; the latch 32 is similar to it except that they are respectively left-handed and right-handed for suitable operation on opposite sides of the chassis element 20.

Referring now to FIGS. 3 through 6, the latch 31 includes a locking member 36 made up generally of its handle portion 33 and an arcuate keeper 37. As described, the outer end of the handle 33 is secured to the knurled gripping arm 34. By means of a screw 38, the locking member 36 is pivotally mounted to a bracket 39 which, in turn, is attached to the upright section 21 of the chassis 20 by screws 40. A curved integrally depending portion 41 of the locking member 36 has a knurled or serrated surface 42 formed thereon against which the arcuate keeper 37 is attached by means of adjustment screws 43 and 44.

The adjustment screws 43 and 44 extend respectively through elongated slots 45 and 46 formed in the keeper 37 so that the keeper is movable to selected positions on the depending portion 41 of the locking member 36. In the open position of the locking member, shown in FIG. 4, the slots 45 and 46 are schematically disposed. Cam means are also provided on the keeper 37 which consist of a cam surface 48 having a radius of curvature formed generally about the pivot screw 38 but curving progressively closer to the pivot screw 38 from the outer end to the base portion of the keeper 37. At the inner end portion of the cam surface 48, it fairs into an arcuate detent 49 substantially equal in diameter to the rotatable pin 19.

It will be noted in both FIGS. 4 and 5, that the depending portion 41 of the locking member 36 is also of arcuate shape and is defined on its outer periphery by a seat 51, a circular edge 52 and a shoulder 53. Mounted in the lower end of the bracket 39 is a vertically movable stop 55 resiliently supported by a spring 56 about a shank portion 57. The extent of travel of the stop 55 relative to the bracket 39 can be controlled by a set screw 59 slidable within a groove formed in the stop 55. The head portion of the stop 55 is of semi-cylindrical shape and is adapted to fit within the circular seat 51 at the end of the locking member 36.

The operation of the new device is as follows: The chassis element 20 may be carried to the apparatus frame 11 by means of the gripping bar 34. With the latches in the open position shown in FIG. 1, the gripping bar 34 is approximately over the center of gravity of the chassis element so that the chassis element depends in a normal fashion when carried.

The initial movement in inserting the chassis element 20 into the frame unit 10 is to place the outer ends of the upright sections 21 of the chassis element within the slots 22. The element 20 is then pushed inwardly into the frame unit 10 until the terminals 27 on the electronic components 26 within the chassis initially engage the stationary terminals 14 within the frame unit. In this position, each of the latches will be disposed relative to the rotatable pins 19 as shown in FIG. 4. The gripping bar 34 is then moved downwardly and inwardly thereby causing the keeper 37 of the locking member 36 to rotate up into substantially tangential contact with the pin 19, as shown by the dotted line position of the keeper in FIG. 4. Further movement of the gripping bar 34 downwardly and inwardly causes the keeper 37 to hook upwardly about the pin 19 such that the cam surface 48 is forced against the pin. The configuration of the cam surface 48 is such that displacement of the chassis element 20 into the frame unit 10 is effected as the keeper 37 carries progressively further over the pin 19.

When the locking member 36 is in its open position shown in FIG. 4, the stop 55 rests within the seat 51 at the end of the depending portion 41 of the locking member, thereby releasably holding the locking member in its open position. However, when the locking member is moved downwardly and inwardly into its closed position as described, the stop 55 rides out of the seat 51 and slides over the circular edge 52. The center of curvature of the circular edge 52 should be at the axis of the pivot screw 38 holding the locking member, so that the stop 55 remains in slidable contact with the edge 52 during closing of the locking member.

The chassis element 20 is displaced inwardly into the frame unit 10 by the cam action of the keeper on the pin 19 until the terminals 27 on the chassis element are fully inserted into the terminals 14 on the frame. At that point, the chassis element 20 reaches its desired fixed position and the pin 19 moves into the detent 49 at the end of the cam surface 48. Also, the stop 55 carries off of the edge 52 onto the shoulder 53 when the chassis assembly 20 has reached its desired location. It will be noted that the latch is retained in this closed position by the engagement of the pin 19 with the detent 49, the engagement of the stop 55 with the shoulder 53, and the weight of the handle which then depends downwardly substantially flush with the face of the chassis.

It is evident in FIGS. 4 and 5 that the chassis element 20 is displaced into the frame at a considerable distance by the cam action of the keeper 37. This distance is indicated by the dotted and solid line positions of the pin 19 in FIG. 5 which illustrate the relative position of the chassis element with respect to the pin 19 both before and after the camming action. This extent of displacement can be varied by adjusting the position of the keeper 37 relative to the depending portion 41 of the locking member 36 by the adjustment screws 43 and 44. If the keeper 37 is as close as possible to the pivot screw 38 of the locking member, the displacement will be at a minimum because the cam surface 48 of the keeper will first engage the pin 19 substantially at its outer end. Hence, substantially the entire length of the cam surface 48 will be utilized for the displacing action. However, if the adjustment screws 43 and 44 hold the keeper 37 at a position removed from the pivot screw 38, the cam surface 48 will first engage the pin 19 at a point remote from its outer end and thus utilize only a portion of its length for displacing the chassis element inwardly. Such adjustment is very useful in compensating for various types of terminals and electronic components carried in the chassis element 20 and mounted in the frame unit 10.

To remove the chassis element 20 from the frame unit 10, the gripping bar 34 is pulled upwardly and outwardly to release the stop 55 from the shoulder 53 and the pin 19 from the detent 49. When the end of the keeper 37 clears the pin 19, the chassis element 20 may be pulled outwardly and removed from the frame. It will be noted that the motions involved in moving the chassis element 20 are quite natural, in that an upward and outward pull is required to separate it from the frame unit and a downward and inward pushing action is required to insert it in the frame and lock it.

It is fully contemplated, of course, that certain variations can be made in this new latching device without departing from the scope of the invention. For example, only one latch may be used or two may be utilized without the cross bar. The new latch finds particular application in electronic chassis, as described, but it can well be employed with various other removable elements and associated frames.

I claim:

1. A latch for use with an element movable into closed position with respect to a frame comprising a locking member pivotally mounted on said element, a separately attached arcuately projecting keeper and a handle extending from said locking member, a pin extending from said frame within the range of upward movement of said keeper when said element is in a position approaching closed position, whereby said keeper may be hooked upwardly about said pin by moving said handle downwardly, a single cam on said locking member defined by one arcuate edge of said keeper and being slidably engageable with said pin to displace said element into closed position when said keeper is hooked upwardly about the pin, a detent in said cam in which said pin releasably seats when said element is in closed position, adjustable attachment means joining said keeper to said locking member for varying the extent to which said element is displaceable by said cam means into closed position, a stop on said element adapted to slidably engage said locking member, and a shoulder on said locking member adapted to abut said stop when said element is in closed position to further releasably hold said element in closed position.

2. A latch for use with a frame and an electronic chassis element movable into closed position with respect thereto, said latch comprising a locking member pivotally mounted on said element, a separately attached arcuately projecting keeper and a handle extending from said locking member on opposite sides of the pivot thereof, a pin extending from said frame within the range of upward movement of said keeper when said element is in a position approaching closed position, whereby said keeper may be hooked upwardly about said pin by moving said handle downwardly, a single cam on said locking member defined by the inner edge of said arcuate keeper and being slidably engageable with said pin to displace said element into closed position when said keeper is hooked upwardly about the pin, a detent in said cam in which said pin releasably seats when said element is in closed position, adjustable attachment screws joining said keeper to said locking member for varying the extent to which said element is displaceable by said cam means into closed position, a resiliently mounted stop on said element adapted to slidably engage said locking member, and a shoulder on said locking member adapted to abut said stop when said element is in closed position to further releasably hold said element in closed position.

References Cited in the file of this patent

UNITED STATES PATENTS

| | | |
|---|---|---|
| 1,943,927 | Phillips | Jan. 16, 1934 |
| 2,132,806 | Ruegg | Oct. 11, 1938 |
| 2,154,936 | Hempel | Apr. 18, 1939 |
| 2,504,364 | Wagner et al. | Apr. 18, 1950 |
| 2,514,246 | Knox | July 4, 1950 |
| 2,574,745 | Langley | Nov. 13, 1951 |
| 2,771,523 | Stoecklin et al. | Nov. 20, 1956 |
| 2,830,843 | Seaburg et al. | Apr. 15, 1958 |